Feb. 1, 1966 E. JAROSCH 3,232,348
ROTARY WING AIRCRAFT
Filed Oct. 15, 1963 3 Sheets-Sheet 1

INVENTOR
Eduard Jarosch

By: McGlew and Toren
ATTORNEYS

Feb. 1, 1966  E. JAROSCH  3,232,348
ROTARY WING AIRCRAFT
Filed Oct. 15, 1963  3 Sheets-Sheet 2
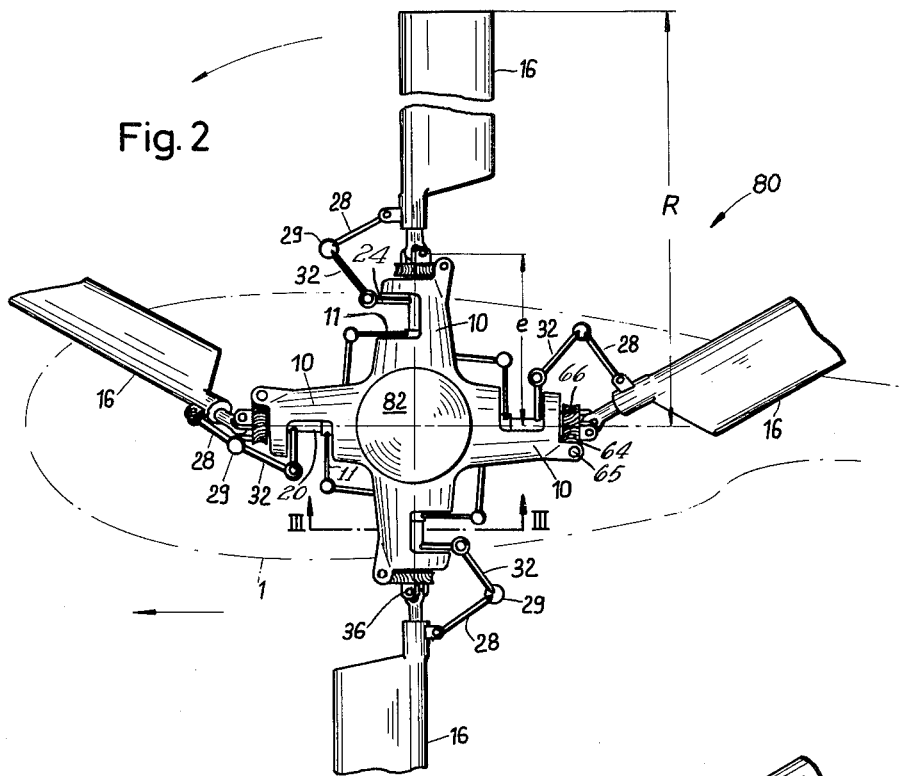
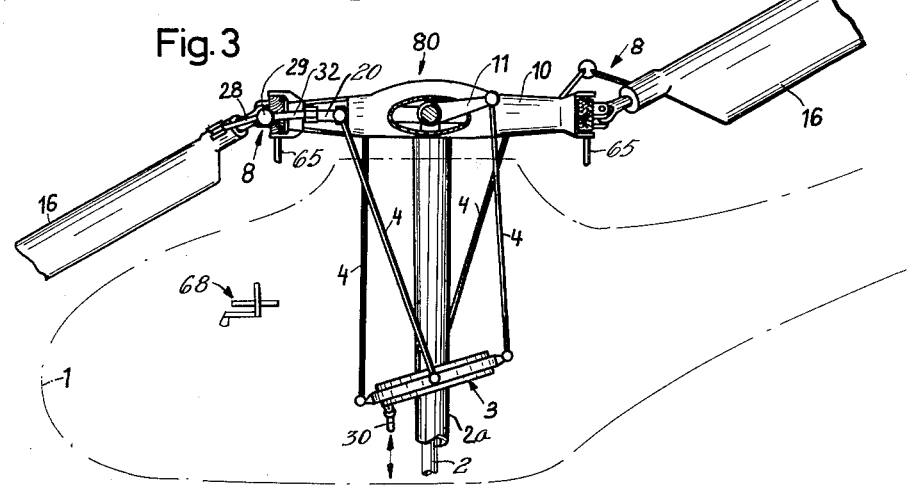
INVENTOR
Eduard Jarosch
BY: McClew and Toren
ATTORNEYS Feb. 1, 1966 E. JAROSCH 3,232,348
ROTARY WING AIRCRAFT
Filed Oct. 15, 1963 3 Sheets-Sheet 3

INVENTOR
Eduard Jarosch

By: McGlew and Toren
ATTORNEYS

United States Patent Office 3,232,348
Patented Feb. 1, 1966

3,232,348
ROTARY WING AIRCRAFT
Eduard Jarosch, Munich, Germany, assignor to Bolkow Gesellschaft mit beschränkter Haftung, Munich, Germany
Filed Oct. 15, 1963, Ser. No. 316,273
Claims priority, application Germany, Oct. 18, 1962, B 69,278
6 Claims. (Cl. 170—160.25)

This invention relates in general to rotary wing aircraft construction, and in particular to a new and useful rotary wing aircraft which includes a rotatable rotor head with at least one rotor blade mounted thereon for rotation therewith and for pivotal lead and lag movement about an inclined lead-lag or drag axis at the inner end of the blade; and which further includes means for cyclically changing the pitch of the blade or its inclination in respect to its own longitudinal axis as the rotor is rotated and independently of the lead-lag and rotational movement of the blade.

The present invention is particularly directed to a helicopter of the type in which one or more rotor blades are mounted on a rotatable rotor head in a manner permitting their rotation with the rotor head as well as their additional forward and retarding movement during rotation, and, in addition, the changing of the pitch of each rotor blade as the rotor head is rotated.

The present invention is an improvement over prior art constructions, particularly in respect to the means for changing the pitch angle of each blade as the rotor head is rotated independently of the change of the lead-lag movement of each blade, and, in addition, in the mounting of the blade in a manner such that the lead-lag pivotal axis, or so-called "drag" axis, may be inclined in respect to the axis of the rotor and preferably in an angular range of between 30 to 60°.

With helicopters of the type mentioned above, when it is desired to increase the flying speed, it is usual to connect the blades positively to means for rotating the blade about its lead-lag axis as the rotor head is rotated. Such mechanism imparts the leading blades with a decreased rotational speed and imparts an increased rotational speed to the lagging blades. Such mechanism for imparting the lead-lag movement of the blades usually includes rigid transmission means. In such constructions the blade pitch angle is adjusted from a central adjusting arrangement such as, for example, a swash plate. Such pitch angle adjustment is usually carried out by means of further transmission or link mechanisms that insure accurate transmission of a desired motion for changing the pitch angle without influencing the lead and lag movement of the blades. Experience has shown that coupling of the lead-lag movement with the blade pitch adjustment movement has disadvantages because such coupling results in an unstable oscillation phenomenon. In other words, if the adjustment of the blade pitch angles results in a simultaneous lead-lag motion change of the blades, the lead-lag motion is usually affected in an undesirable manner.

A peculiarity of the lead-lag motion of the rotor blades is that the inherent or characteristic frequency of the blades is relatively low at the usual drag joint distances, that is, the distance from the lead-lag axis or drag joint to the axis of the rotor head. Consequently, the blades are relatively slow to oscillate in the lead-lag direction and an adjustment of the blades in rhythm with the rotor speed can only be obtained by applying large control transmission forces. This performance of the blades may be influenced by increasing the drag joint distance, that is, by mounting the blades at a greater distance from the rotational axis of the rotor. For example, if the drag joint distance or distance from the axis of the rotor to the lead-lag axis is designated by $e$ and the radius of the overall rotor or the distance from the axis of rotation to the tips of the blades is designated by $R$, and if the ratio of $e/R$ is made from about 0.37 to 0.40, then, depending on the distribution of the blade mass, the characteristic or inherent frequency of the lead-lag motion is equal to the speed of the rotor.

However, it should be appreciated that with an increase of the drag joint distance, the central portion of the rotor head becomes very large and heavy. Due to the higher aerodynamic resistance and the lack of lifting power of these parts, the output losses also increase.

In accordance with the present invention, a rotary wing aircraft of the above kind is provided which does not have the drawbacks of the known rotary wing aircraft, as mentioned previously. In particular the invention includes a construction of rotor head with blades pivotally mounted thereon for lead and lag movement as well as for rotation with the rotor. In addition, the blades are constructed for pitch angle changes or pivotal movement about their longitudinal axes. The pitch angle is changed during rotation of the rotor without disturbing the lead and lag movement of the blades. The blades are mounted for lead and lag movement about a lead-lag axis which is inclined. The rotor assembly is such that when the resonant condition of the rotor blade is achieved, the ratio $$\frac{\omega_e}{\omega_{R_0}} = 1$$

In such a condition the lead-lag motion of the blades can be obtained with a very small control force. In this formula $\omega_e$ indicates the inherent or characteristic frequency of the lead-lag motion, while $\omega_{R_0}$ is the angular velocity of the rotation.

In the preferred arrangement of the invention, the drag joint distance is maintained at a minimum to achieve the desirable conditions indicated above. In addition, the lead-lag axis or drag joint axis in respect to the rotational direction of the blades is inclined in an oblique manner, preferably within an angular range of from between 30 to 60°. The optimum angle of inclination of the drag joint axis is obtained with the resonant condition of operation.

Accordingly, it is an object of this invention to provide an improved helicopter rotor construction.

A further object of the invention is to provide a helicopter rotor which includes a rotatable rotor head with at least one blade mounted thereon for pivotal lead-lag movement about a lead-lag axis in addition to rotation with said rotor about the rotor axis, and with means for changing the pitch angle or inclination of the blade about its own longitudinal axis as the blade is rotated with the rotor, and wherein the mounting of the blades for pivotal lead-lag movement is such as to permit an inclination of the lead-lag axis.

A further object of the invention is to provide a helicopter rotor wherein the blades are mounted on the rotatable rotor head for pivotal movement in lead-lag directions about a lead-lag axis which is inclined, preferably in the range of from 30 to 60°.

A further object of the invention is to provide a helicopter capable of very high speeds which includes a mounting for the blades of the helicopter to permit the operation thereof in a substantially resonant condition with a minimum of control transmission power being required.

A further object of the invention is to provide a helicopter which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 2 is a plan view of the rotor head indicated in FIG. 1;

FIG. 3 is a section taken on the line 3—3 of FIG. 2;

Figure 1:
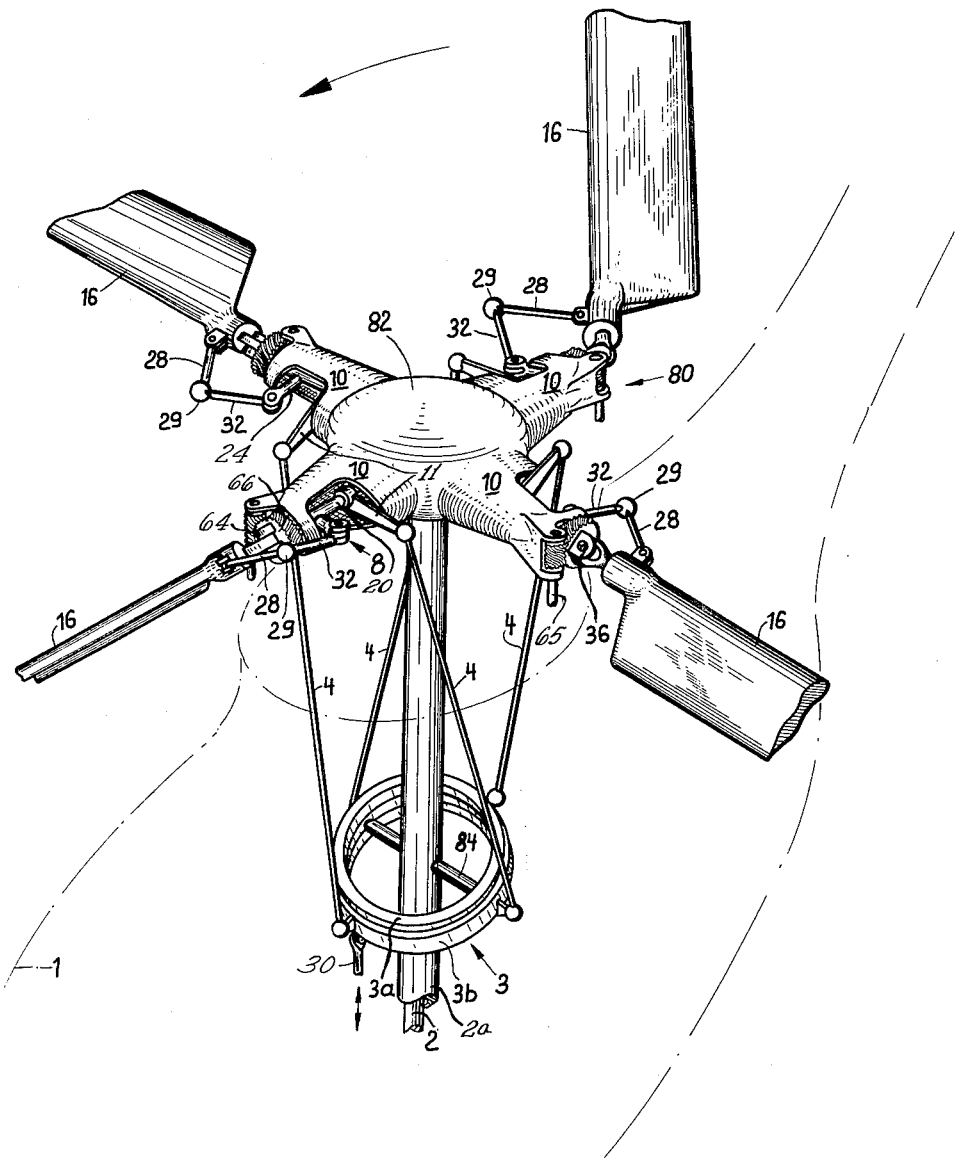
FIG. 1 is a somewhat schematic perspective view of a helicopter having a rotor constructed in accordance with the invention.

Referring to the drawings in particular, the invention embodied therein comprises a rotor head generally designated 80 which is mounted on a helicopter indicated in dotted lines at 1. The rotor 80 includes a rotor shaft 2 which is rotated by means (not shown). The shaft 2 is rotatable within a sleeve 2a which is fixed and which carries a rotor head portion 82 at its upper end which is rotated by the shaft 2. A swash plate generally designated 3 is mounted on a pivot member or pin 84 held at one end by the sleeve 2a against rotation. The swash plate 3 may be pivoted on the pin 84 by control means (not shown) for effecting the desired control of the pitch angle of the helicopter rotor blades 16. In this instance, four rotor blades 16 are provided. The swash plate 3 includes an inner portion 3a which is held by the pivot pin 84 against rotation and an outer portion 3b which is rotatable around the inner portion. The outer portion 36 carries a plurality of pusher rods 4 of a number corresponding to the number of blades. The rods 4 are arranged at equally spaced angular locations on the swash plate portion 3b. The inclination of the swash plate 3 is adjusted in a known manner by means of control acting through a link 30.

As the shaft 2 rotates when the swash plate 3 is inclined, each lever 4 is moved upwardly and downwardly, and this up and down movement is transmitted through a linkage mechanism generally designated 8 to oscillate a link 11 connected to a shaft 20. The shaft 20 extends radially in each of four arm portions 10 of the rotor 80 (see FIG. 4).

The linkage mechanism 8 comprises a rigid arm 24 which is connected to the inner end of each shaft 20 and to the opposite end of which is pivotally connected a link 32. As indicated particularly in FIGS. 2 and 4, link 32 is connected to a link 28 through a ball joint 29. The links 28 and 32 are oscillated independently of the operation of any other mechanism to oscillate shaft 20 by the arm 24. Oscillation of the links 32 and 28 is effected by the shaft 20 which, in turn, is oscillated by means of a lever 11 attached to the upper ends of each of the pusher rods 4. The linkage mechanism is such that the arms 28 and 32 are of the same length and the joint axes extend parallel to each other at the connecting portions of the links and have the same distance from the mounting axis of the rotor blades to insure that when the lead-lag motion of the blades occurs, the means for adjusting the pitch angles is not influenced.

Figure 4:
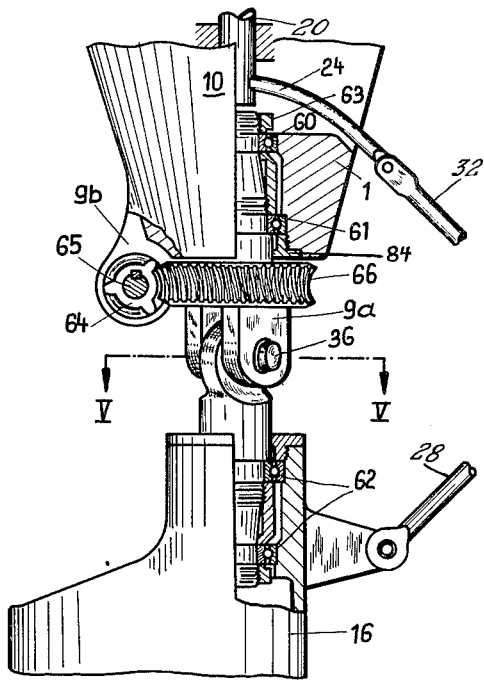
FIG. 4 is a partial plan and partial sectional view of a portion of the rotor head and one blade with the drag joint or lead-lag axis indicated at an angle of 45° in respect to the rotational axis of the rotor head.

A feature of the invention is that each of the blades 16 is mounted on the rotor 80 by means of a drag joint or lead-lag axis defined by a pivot pin 36 which may be inclined. As best indicated in FIG. 4, the pivot pin 36 defining the lead-lag axis is inclined in respect to the plane of rotation advantageously within an angular range of from between 30 to 60°. This results in the inventive advantages.

The distance from the center of the axis of the rotor 82 to the drag joint axis 36, as indicated in FIG. 2, is designated by $e$ (FIG. 2). The distance from the center of rotation of the rotor 82 to the tips of each of the rotor blades 16 is designated by R.

The inclination of the mounting or lead-lag axis has a predetermined value which is dependent on the drag joint distance and on the mass distribution over the blade length. This value is determined by the relations $$\frac{\omega_e}{\omega_{R_o}} = \sqrt{\cos^2 \xi \frac{\int_o^L m_x \times d_x}{\int_o^L m_x \times^2 d_x} \cdot e}$$

wherein the resonance condition $$\frac{\omega_e}{\omega_{R_o}} = 1$$

prevails. Based on these conditions, an optimum angle $\xi$ for the inclination of the lead-lag or pivot axis within the indicated range can be calculated for each practical drag joint distance $e$ so that $\omega_e = \omega_{R_o}$ is fulfilled.

When the rotor blade is articulated at the rotor head through the axis which is inclined relative to the rotational direction of the rotor, then a flapping movement causes a downward movement of the blade together with an advance in the sense of the rotor rotation.

By contrast, an upward movement of the blade is connected with a trailing or return movement of the blade in the rotational sense of the rotor. In this manner, it is accomplished that upon corresponding cyclic blade pitch angle adjustment, the air stream accomplishes the lead-lag motion of the blades as long as an inherent frequency is maintained which conforms to the rotor speed.

Figure 6:
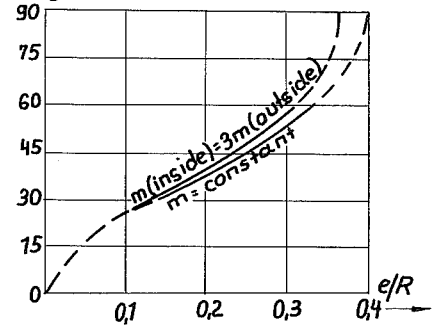
FIG. 6 is a graphic representation of the course of the angle of inclination in dependence on the ratio of the drag joint distance to the overall radius from the center of the rotor axis to the tips of the blades for a constant and an assumed linear mass distribution.

FIG. 6 indicates, for example, the inclination angles $\xi$ in dependence on $e/R$ for an assumed constant mass distribution and for a linear mass distribution.

For the constant mass distribution, it follows that $$\frac{\omega_e}{\omega_{R_o}} = \sqrt{\cos^2 \xi + \frac{3}{2} \cdot \frac{e/R}{1 - e/R}}$$

For the linear mass distribution, in which it is assumed that the mass at the blade root is three times as large as at the blade point, it is obtained that $$\frac{\omega_e}{\omega_{R_o}} = \sqrt{\cos^2 \xi + \frac{5}{3} \cdot \frac{eR}{1 - e/R}}$$

From the graphical representation of FIG. 6 and the preceding formulae, it is apparent that after the drag joint distance $e$ of the rotary wing aircraft has been fixed, a predetermined angle of inclination has to be maintained if resonance is to be present. In the reverse, if first an angle of inclination within 30 and 60° is fixed, a predetermined drag joint distance has to be maintained, if resonance is to be present. Therefore, it is clear that there is a definite relationship between the drag joint distance and the angle of inclination.

From a practical point of view, no positive lead-lag drive is necessary since the air forces which engage at the blade during speed flight possess, with regard to the mounting axis, a moment component which automatically adjusts the blade in the correct sense.

Figure 5:
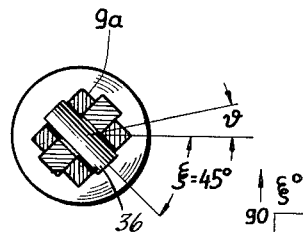
FIG. 5 is a section taken on the line 5—5 of FIG. 4.

In the embodiment, as shown in FIG. 5, a mounting axis inclination of 45° has been assumed. The symbol $\vartheta$ in this figure indicates the blade pitch adjusting angle. At a constant blade mass distribution and at a rotor diameter of $D = 2R = 10$ m., the above formulae and the graph in FIG. 6 yield a drag joint distance $e$ of 1.25 meters and $e/R = 0.25$. If $\xi$ at the same rotor would amount to, for example, 64°, then already a drag joint distance $e$ of 1.75 meters would be obtained. This comparison clearly shows that due to the inclined position of the mounting axis within the mentioned critical angular range, a considerable shortening of the drag joint distance is obtained, while maintaining the resonance condition, if compared with the prior art constructions wherein the mounting axis of the rotor extends perpendicular. With a linear blade mass distribution assumed in FIG. 6 and with an equal drag joint distance $e$ and an equal value for $e/R$, the angle of inclination changes only to an insignificant extent to the value 48.2°.

According to a further feature of the invention, the air force moment which causes the lead-lag motion can be influenced by changing the magnitude of inclination of the lead-lag axis. For this purpose each arm portion 10, as indicated in FIG. 4, is provided with a bushing for rotatably receiving a combination worm wheel 66 and mounting yoke 9a for the pivot pin 36. The worm wheel 66 and the mounting yoke 9a rotate on ball bearings 60 and 61 in each arm portion 10 of the rotor head 82. Each blade 16 is similarly mounted on ball bearings 62 for rotation for pitch angle adjustment. The yoke 9a and worm wheel 66 are secured in respect to an axial direction by means of a nut 63. The changing of the angle of inclination of the drag axis 36 is effected by means of a worm 64 which is affixed to a shaft 65. The worm and shaft are carried on a bearing portion 9b formed at the outer end of the arm portions 10. The worm is rotated by a control means such as an adjusting crank 68 for each worm separately or for all worms simultaneously which is operated by the pilot to cause rotation of the worm wheel 66 and adjustment of the angle of inclination of the pivot pin 36. This mechanism is schematically indicated in FIG. 3 and includes a crank 68 connected such as by flexible cable (not shown) to the shaft 65. The mechanism 64 will normally comprise means which will not rotate with the rotor and may be either mechanical means or electrical such as individual servo-motors. This mechanism for adjusting the drag axis defined by the pin 36 permits not only the easy adjustability of this mounting axis but also provides an advantage, for example, for maintaining the flapping movement and lead-lag movement of the rotor blades in the event of gusts or unbalancing wind forces. When such gusts are encountered, it should be appreciated that such flapping movement oftentimes takes another course than during stationary undisturbed flight.

In the event that higher flying speeds are desired and the correlated values according to FIG. 6 cannot be maintained, then the free lead-lag movement of the rotor blades may be facilitated or assisted by mechanical drive means. However, if this is done, then this positive forced-upon drive for the lead-lag motion has the advantage relative to the known mechanical lead-lag drive that smaller forces occur in the control members and transmission parts than in purely mechanical lead-lag rotors. This is so because in the inventive rotary wing aircraft, the lead-lag drive primarily is accomplished by means of the air forces which engage at the blades.

While specific embodiments of the invention have been shown and described in detail to illustrate the application of the inventive principles, it will be understood that the invention may be embodied otherwise without departing from such principles.

What is claimed is:

1. A blade disposition control device for a rotary wing aircraft, comprising a rotatable rotor head, a blade mounted on said head for rotation therewith about a rotor axis which is normally substantially vertical, means mounting said blade on said rotor head defining a lead-lag axis spaced radially from the rotor axis for pivotal lead-lag movement of said blade in addition to its rotation along with rotation with said rotor, said mounting means forming a lead-lag pivoting axis extending at an angle of approximately between 30 and 60° in respect to the axis of rotation of said rotor head, said blade also being pivotal about its own longitudinal axis, and blade pitch adjusting means connected to said blade for pivoting said blade about its own longitudinal axis to obtain a pitch adjusting movement, said blade pitch adjusting means being independent of the lead-lag movement of said blade, said means mounting said blade on said rotor head being adjustable for changing the lead-lag pivoting axis.

2. A blade disposition control device for a rotary wing aircraft, comprising a rotatable rotor head, a blade mounted on said head for rotation therewith about a rotor axis which is normally substantially vertical, means mounting said blade on said rotor head defining a lead-lag axis spaced radially from the rotor axis for pivotal lead-lag movement of said blade in addition to its rotation along with rotation with said rotor, said mounting means forming a lead-lag pivoting axis extending at an angle of approximately between 30 and 60° in respect to the axis of rotation of said rotor head, said blade also being pivotal about its own longitudinal axis, and blade pitch adjusting means connected to said blade for pivoting said blade about its own longitudinal axis to obtain a pitch adjusting movement, said blade pitch adjusting means being independent of the lead-lag movement of said blade, said means mounting said blade on said rotor head including a yoke member having means thereon defining a pivot for said blade for lead-lag movement, and means for rotating said yoke member.

3. A blade disposition control device for a rotary wing aircraft, comprising a rotatable rotor head, a blade mounted on said head for rotation therewith about a rotor axis which is normally substantially vertical, means mounting said blade on said rotor head defining a lead-lag axis spaced radially from the rotor axis for pivotal lead-lag movement of said blade in addition to its rotation along with rotation with said rotor, said mounting means forming a lead-lag pivoting axis extending at an angle of approximately between 30 and 60° in respect to the axis of rotation of said rotor head, said blade also being pivotal about its own longitudinal axis, and blade pitch adjusting means connected to said blade for pivoting said blade about its own longitudinal axis to obtain a pitch adjusting movement, said blade pitch adjusting means being independent of the lead-lag movement of said blade, said means mounting said blade on said rotor head including a yoke member having means thereon defining a pivot for said blade for lead-lag movement, and means for rotating said yoke member, said means for rotating said yoke member including a worm wheel secured to said yoke member and a worm connected to said yoke member and being rotatable for rotating said worm wheel.

4. A helicopter comprising a rotatable rotor head rotatable about a substantially vertical axis, blade lead-lag pivotal mounting means rotatably carried by said head and defining a lead-lag blade axis at a spaced location from the rotor axis, a blade pivotally mounted on said rotor head blade lead-lag pivotal mounting means and being pivotally movable for lead and lag movement about the lead-lag blade axis as well as for rotative movement with said rotor head, means to rotate said rotor head, said blade having means permitting pivotal movement about its own longitudinal axis for pitch adjustment of said blade, and means on said rotor head connected to said blade to pivot said blade about its longitudinal axis for pitch adjustment, said blade lead-lag pivotal mounting means being disposed obliquely in respect to the axis of rotation of said rotor head, said blade lead-lag pivotal mounting means comprising a yoke member rotatably carried by said rotor head and means to rotate said yoke member for shifting the lead-lag pivotal axis of said blades.

5. A helicopter comprising a rotatable rotor head rotatable about a substantially vertical axis, blade lead-lag pivotal mounting means rotatably carried by said head and defining a lead-lag blade axis at a spaced location from the rotor axis, a blade pivotally mounted on said rotor head blade lead-lag pivotal mounting means and being pivotally movable for lead and lag movement about the lead-lag blade axis as well as for rotative movement with said rotor head, means to rotate said rotor head, said blade having means permitting pivotal movement about its own longitudinal axis for pitch adjustment of said blade, and means on said rotor head connected to said blade to pivot said blade about its longitudinal axis for pitch adjustment, said blade lead-lag pivotal mounting means being disposed obliquely in respect to the axis of rotation of said rotor head, said blade lead-lag pivotal mounting means comprising a yoke member rotatably carried by said rotor head and means to rotate said yoke member for shifting the lead-lag pivotal axis of said blades, said means for rotating said yoke member including a worm wheel and a worm connected to said worm wheel for rotating said worm wheel.

6. A rotary wing aircraft with a device for performing lead-lag motion of the rotor blades in the rotational plane of the rotary wing, wherein the blades which are being moved forwardly in respect to the direction of flight are imparted with a decreased rotational speed by a lagging pivotal movement and the blades which are moved rearwardly in respect to the direction of flight are imparted with an increased rotational speed by a leading pivotal movement, a rotatable rotor head rotatable about a substantially vertical axis, blade lead-lag pivotal mounting means carried by said head and defining a lead-lag axis at a spaced location from said rotor axis, blade pivotally mounted on said rotor head blade lead-lag pivotal mounting means and being pivotally movable about said lead-lag axis for lead and lag movement as well as for rotative movement with said rotor head, means to rotate said rotor head, said blade having means permitting pivotal movement about its longitudinal axis for pitch adjustment of said blade, and means on said rotor head connected to said blade to pivot said blade about its longitudinal axis for pitch adjustment as it is rotated, said blade lead-lag pivotal mounting means being disposed oblikuely in respect to the axis of rotation of said rotor head, said lead-lag axis of the rotor blades being inclined in respect to the rotational direction of said rotor head in such a manner that with the resonant condition $$\left(\frac{\omega_c}{\omega_{R_0}}=1\right)$$

the ratio of the inherent frequency $\omega_c$ of the lead-lag motion to the angular velocity or frequency $\omega_{R_0}$ of the rotor rotation is equal to the square root of the sum:

(a) the square of the cosine of the inclination angle $\xi$ of the lead-lag axis, and (b) the product obtained by multiplying the drag joint distance $e$ with the ratio of the moment of inertia of the blades of the first order to the moment of inertia of the blades of the second order relative to the lead-lag axis.

References Cited by the Examiner

UNITED STATES PATENTS

| | | | |
|---|---|---|---|
| 1,870,928 | 8/1932 | Smith | 170—160.33 |
| 2,121,536 | 6/1938 | Bennett | 170—160.56 |
| 2,162,794 | 6/1939 | Asboth | 170—160.27 |
| 2,201,810 | 5/1940 | Campbell | 170—160.56 |
| 2,418,030 | 3/1947 | Hirsch | 170—160.56 |
| 2,506,210 | 5/1950 | Goodson | 170—160.56 |
| 2,511,687 | 6/1950 | Andrews | 170—160.56 |
| 2,555,577 | 6/1951 | Daland | 170—160.25 |
| 2,692,650 | 10/1954 | Pullin | 170—160.25 |
| 3,152,647 | 10/1964 | Derschmidt et al. | 170—160.56 X |

FOREIGN PATENTS

| | | |
|---|---|---|
| 264,753 | 1/1927 | Great Britain. |
| 1,005,054 | 12/1951 | France. |

OTHER REFERENCES

A.P.C. application of Flettner, Ser. No. 254,867, published May 25, 1943.

JULIUS E. WEST, *Primary Examiner.*